US012600075B2

(12) United States Patent
Huff

(10) Patent No.: US 12,600,075 B2
(45) Date of Patent: Apr. 14, 2026

(54) VALVE DEVICE AND BLOW MOLDING SYSTEM

(71) Applicant: Technical Response, Inc., Knoxville, TN (US)

(72) Inventor: Leonard Scott Huff, Knoxville, TN (US)

(73) Assignee: Technical Response, Inc., Knoxville, TN (US)

( * ) Notice: Subject to any disclaimer, the term of this patent is extended or adjusted under 35 U.S.C. 154(b) by 96 days.

(21) Appl. No.: 18/635,290

(22) Filed: Apr. 15, 2024

(65) Prior Publication Data

US 2024/0359390 A1 Oct. 31, 2024

(30) Foreign Application Priority Data

Apr. 25, 2023 (CN) .......................... 202321000526.0

(51) Int. Cl.
*B29C 49/24* (2006.01)
*B29C 49/42* (2006.01)
B29C 49/20 (2006.01)

(52) U.S. Cl.
CPC ...... *B29C 49/4289* (2013.01); *B29C 49/2408* (2013.01); *B29C 2049/2021* (2013.01); *B29C 2049/2472* (2013.01)

(58) Field of Classification Search
CPC ............ B29C 49/4289; B29C 49/2408; B29C 2049/2021; B29C 2049/2472
See application file for complete search history.

(56) References Cited

U.S. PATENT DOCUMENTS

2007/0214838 A1* 9/2007 Fenton .................... B29C 49/48
65/261

FOREIGN PATENT DOCUMENTS

JP H04107121 A * 4/1992

OTHER PUBLICATIONS

JPH04107121A machine translation (Year: 1992).*

* cited by examiner

*Primary Examiner* — Alison L Hindenlang
*Assistant Examiner* — Alexander A Wang
(74) *Attorney, Agent, or Firm* — Luedeka Neely, P.C.

(57) ABSTRACT

Disclosed are a valve device and a blow molding system. The valve device is used in a blow mold and one or two decorative labels for affixing to a bottle body are placed in the blow mold. The valve device comprises a base and at least one pin arranged on the base, wherein the pin is inserted into a vacuum suction hole of the blow mold. The valve device opens the vacuum suction holes to create negative pressure and enable a decorative label to be adsorbed to the inner wall of the blow mold, and blocks the vacuum suction holes to achieve detachment between the decorative label and the inner wall of the blow mold, thereby adhering the decorative label to the bottle body to complete the production.

9 Claims, 3 Drawing Sheets

VALVE DEVICE AND BLOW MOLDING SYSTEM

CROSS-REFERENCE TO RELATED APPLICATIONS

The present disclosure claims priority to Chinese patent application No. 202321000526.0, filed Apr. 25, 2023, all of which is herein incorporated by reference.

FIELD OF THE DISCLOSURE

The present disclosure relates to the field of blow molding, and in particular to a valve device and a blow molding system.

BACKGROUND

In existing designs, relying on electrostatic adsorption of lighter decorative films (1-3 g) renders it unreliable or unfeasible to adsorb heavier decorative labels (26-31 g).

Chinese patent CN111660504A discloses an injection mold for transfer printing inside an automobile front panel mold, comprising stationary mold multi-plates and movable mold multi-plates. A gate, a spacer, a hot runner support, and a fixed mold plate are arranged on the stationary mold multi-plates. Mold feet, a top plate, and a movable mold plate are arranged on the movable mold multi-plates, with a mold cavity set between the movable mold plate and stationary mold plate. A positioning mechanism is arranged in the mold cavity on the stationary mold side, with lateral hot nozzles connected under the hot runner support. A small slider is arranged on the movable mold plate with a hidden gate, and during injection molding, a decorative film piece matching the mold cavity is placed on the positioning mechanism and integrally molded into the automobile front panel with the decorative film piece. A pin connected to the top plate contacts the molded automobile front panel with the decorative film piece through the movable mold plate. Upon mold opening, the top plate is driven by ejection power to drive the pin to lift the molded automobile front panel with the decorative film piece, while the sliding mechanism drives the small slider outward to break off the residual material in the hidden gate, allowing smooth demolding of the automobile front panel with the decorative film piece.

However, in the prior art, the positioning mechanism adopts a structure with grooves corresponding to perforations on the decorative film piece, which compromises the integrity of the decorative film piece and affects the appearance. Furthermore, due to the lightweight of the decorative film piece, when a heavier and complete decorative label is required in blow molds, the adsorption capacity between the decorative label and the inner wall of the mold needs improvement.

Therefore, the existing technology still needs to be improved and developed.

BRIEF SUMMARY OF THE DISCLOSURE

In view of the above problems, embodiments of the present disclosure provide a valve device and a blow molding system, aiming to solve the problem in the prior art that the adsorption and release effect between the decorative label and the inner wall of the blow mold needs to be improved.

Embodiments of the present disclosure provide the following technical solutions to solve the above technical problems.

A first aspect of the present disclosure provides a valve device. The valve device is applied to a blow mold, and a decorative label for affixing to a bottle body is placed in the blow mold. The valve device includes a base and at least one pin arranged on the base, wherein one pin is inserted into a vacuum suction hole of the blow mold, wherein the base is able to abut against or away from an outer wall of the blow mold to facilitate an inner wall of the blow mold to release or adsorb the decorative label.

In some embodiments of the valve device, a diameter of the pin is in a range of 0.2 mm to 3 mm.

In some embodiments of the valve device, multiple pins are arranged, and the multiple pins are evenly arranged on a head end of the base.

In some embodiments of the valve device, five pins are arranged, wherein four pins are distributed at each end point of a cross shape and one pin at a midpoint of the cross shape.

In some embodiments, the valve device further includes a driver connected to the base and used to control a movement of the base.

In some embodiments, the valve device further includes a mounting member located on a side of the base away from the pin, and a mounting hole is arranged on the mounting member, wherein one end of the driver is arranged in the mounting hole.

In some embodiments of the valve device, a plurality of embedding holes are arranged evenly on the head end of the base, and the pins are arranged in one-to-one correspondence with the plurality of embedding holes.

In some embodiments of the valve device, a plurality of grooves distributed in an array are arranged on an edge of the base, and the plurality of grooves are adopted to guide a flow of air on an inner side and an outer side of the vacuum suction hole.

A second aspect of the present disclosure provides a blow molding system, which includes the valve device and the blow mold as described in any one of the above.

In some embodiments, the blow mold is provided with at least one vacuum suction hole, and the vacuum suction hole corresponds to the pin.

In some embodiments, the blow molding system further includes a pump body located outside the blow mold. The pump body is adopted to extract air in the blow mold through the vacuum suction hole to facilitate the inner wall of the blow mold to adsorb the decorative label.

Beneficial effects: The present disclosure provides a valve device and a blow molding system. The valve device is applied to a blow mold. The blow mold is internally provided with one or two decorative labels for ultimately affixing to a bottle preform. The valve device comprises: a base; at least one pin arranged on the base, with one pin being inserted into a vacuum suction hole of the blow mold. The base is able to abut against an outer wall of the blow mold, so as to release or adsorb the decorative label on an inner wall of the blow mold. The valve device of the present disclosure sets at least one pin to be respectively inserted into the vacuum suction hole of the blow mold, and a synchronized movement of at least one pin enables the pin to move away from the blow mold to release the vacuum suction hole, thereby allowing air to be extracted from an inner side of the blow mold through the vacuum suction hole to an outer side of the blow mold, creating negative pressure and enabling a heavier decorative label to be adsorbed to the inner wall of the blow mold. The synchronized movement of at least one pin can also move the pin toward the blow mold, and when a head end of the base abuts against the outer wall of the blow mold, the base completely blocks vacuum suction holes, achieving detachment between the decorative label and the inner wall of the blow mold, enhancing the adsorption and release effects between the decorative label and the inner wall of the blow mold, facilitating the bonding of the decorative label to the bottle body to complete the production of the product.

In addition to the technical problems solved by the present disclosure, the technical features constituting the technical solutions and the beneficial effects brought by the technical features of these technical solutions described above, other solved problems, technical features contained in the technical solutions and the beneficial effects brought by the technical features for the valve device and the blow molding system provided by the present disclosure are further described in detail in the embodiments.

BRIEF DESCRIPTION OF THE DRAWINGS

In order to provide a clearer explanation of the embodiments of the present disclosure or the technical solutions in the prior art, a brief introduction to the drawings required for the description of the embodiments or the prior art in the following description is provided. It is evident that the drawings described below are some embodiments of the present disclosure. These drawings and accompanying descriptions are not intended to limit the scope of the present disclosure in any way, but rather to illustrate the concepts of the present disclosure to those skilled in the art by reference to embodiments. For those skilled in the art, additional drawings can be obtained based on these drawings without the exercise of creative labor.

Figure 1:
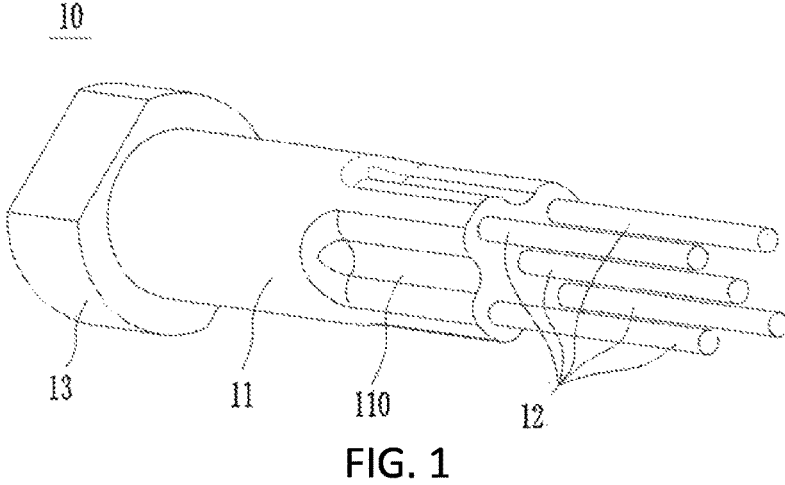
FIG. 1 is a perspective view of a valve device according to an embodiment of the present disclosure.

Explanation of reference labels: 10—Valve device; 11—Base; 110—Groove; 111—Embedding hole; 12—Pin; 13—Mounting member; 130—Mounting hole; 21—Blow mold; 22—Decorative label; 23—Bottle body.

DETAILED DESCRIPTION OF EMBODIMENTS

In order to make the purpose, technical solutions and effects of the present disclosure clearer, the technical solutions in the embodiments of the present disclosure are clearly and completely described below in conjunction with the drawings according to the embodiments of the present disclosure. Obviously, the described embodiments are only part of the embodiments of the present disclosure, but not all the embodiments. Based on the embodiments in the description, any other embodiments obtained by those skilled in the art without creative efforts fall within the scope of protection of the present disclosure.

The mold in the blow molding equipment is used in conjunction with the blow molding machine. The quality of blow molded products is closely related to the level of mold design and production. The main structure of blow molds for different plastic products is similar, consisting of two halves of the mold. The mold can be designed as a fixed mold plus a movable mold, or both molds can be movable. Structurally, it mainly consists of a cavity, a mold body, a cooling system, a cutting device, exhaust holes or grooves, and a guiding mechanism. For more complex blow molded products, the mold may also require special designs such as inserts, core pulls, segmented opening and closing molds, and negative pressure. The field covered by the present disclosure includes mold structure (partial vacuum extraction mechanism), negative pressure system (by means of suction hole structure, and associated system design), and achieving functions such as closing plugs and preventing molten material from being blown into the vacuum channel and causing blockages.

In existing designs electrostatic force is only used to adsorb lighter decorative films (1-3 g), and cannot be used to guarantee the reliability of the adsorption or complete the adsorption of heavier decorative label (26-31 g).

Based on the above problems, embodiments of the present disclosure provide a valve device and a blow molding system. In an embodiment, the valve device can only be provided with one pin with larger diameter, corresponding to a vacuum suction hole with larger diameter on the blow mold. Therefore, the one pin is inserted into the vacuum suction hole with larger diameter, and by moving the one pin, the adsorption or release of the decorative label can be achieved, which facilitates the bonding between the decorative label and the bottle body to complete the product.

Due to the need to adsorb heavier decorative label, when considering the design of only one vacuum suction hole, the diameter of the vacuum suction hole needs to be enlarged. The corresponding valve only has one block member with larger diameter to block the vacuum suction hole, which would easily lead to vacuum failure, resulting in poor adsorption between the label and the mold.

In an embodiment of the present disclosure, the valve device achieves better performance by setting multiple pins to be inserted separately into the vacuum suction holes of the blow mold. When the driver of the valve device retracts, the multiple pins move synchronously, allowing them to move away from the blow mold and open multiple vacuum suction holes. This allows air to be extracted from the inside of the blow mold through the multiple vacuum suction holes to the outside of the blow mold, creating negative pressure. As a result, both lighter and heavier decorative labels can be adsorbed to the inner wall of the blow mold. The synchronous movement of the multiple pins can also cause them to move toward the blow mold. When the head end of the base abuts against the outer wall of the blow mold, multiple vacuum suction holes are completely blocked, achieving detachment between the decorative label and the inner wall of the blow mold. As the plastic bottle preform expands, the decorative label adheres to the bottle body, completing the production of the product.

The technical solution of the present disclosure and how the technical solution of the present disclosure solves the above technical problems are described in detail below with embodiments. The following embodiments can be combined with each other, and the same or similar concepts or processes may not be described again in some embodiments. The valve device provided by the embodiments of the present disclosure are described in detail below with reference to FIG. 1-FIG. 7.

Figure 2:
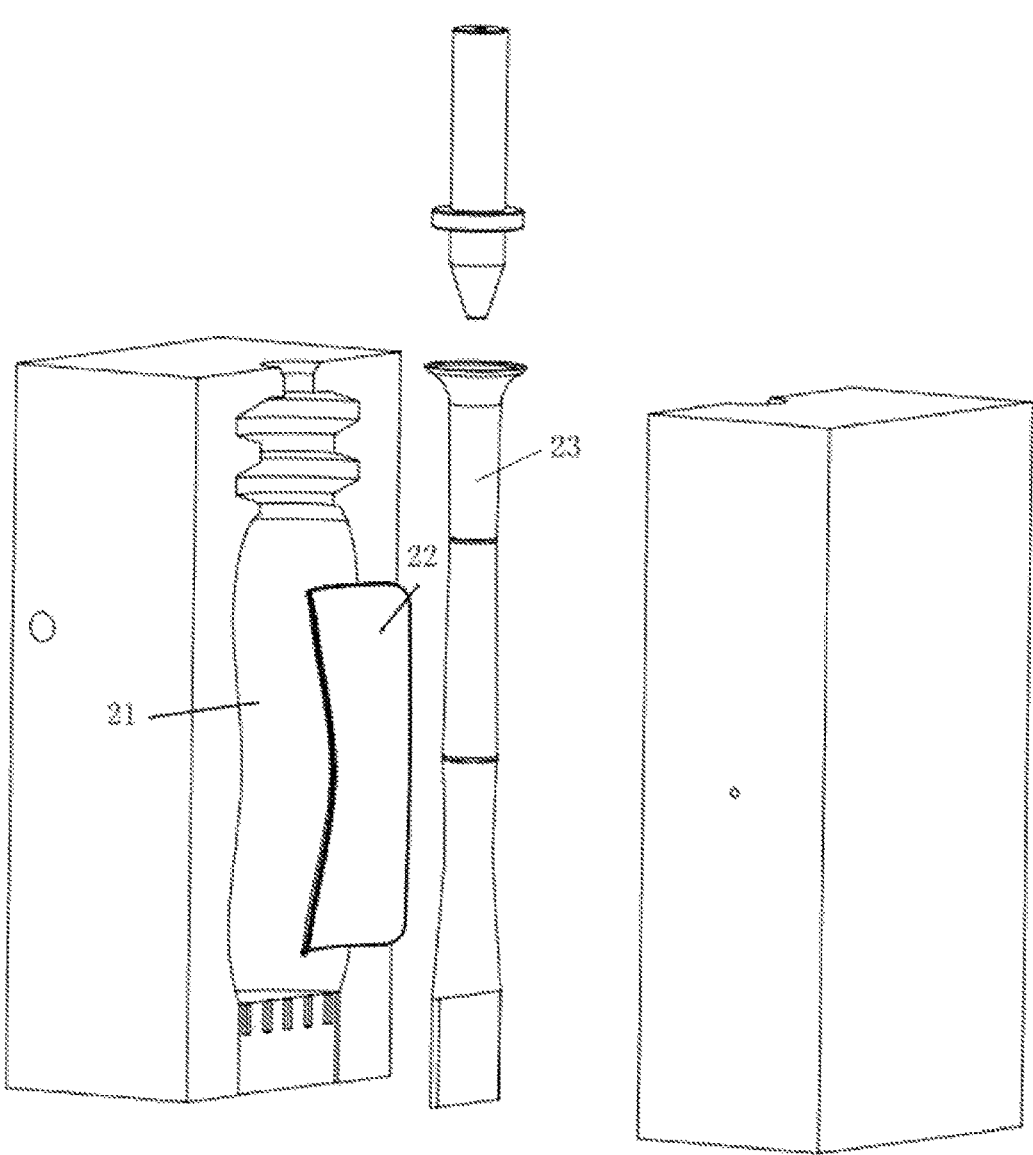
FIG. 2 is a schematic disassembly diagram of the blow mold and decorative label according to an embodiment of the present disclosure.

FIG. 1 is a perspective view of the valve device provided by an embodiment of the present disclosure, and FIG. 2 is a disassembled schematic diagram of the blow mold and decorative label provided by the embodiment of the present disclosure.

As shown in FIG. 1 and FIG. 2, the embodiment of the present disclosure provides a valve device 10, which is applied to a blow mold 21, and a decorative label 22 for affixing to the bottle body 23 is placed in the blow mold 21. The valve device 10 includes a base 11 and at least one pin 12 (multiple in the present embodiment) provided on the base 11. Each pin 12 is inserted into a vacuum hole (not shown in the drawings) of the blow mold 21. The base 11 can abut against an outer wall of the blow mold 21 so that an inner wall of the blow mold 21 releases or adsorbs the decorative label 22. It can be understood that the valve device of the present disclosure can be integrally formed or assembled from separate parts, which is not specifically limited here.

As shown in FIG. 1, the base 11 has a head end and a tail end. The head end is located on a side close to the pin (i.e., the right side), and the tail end is located on a side away from the pin (i.e., the left side). The head end of the base 11 is cross-shaped, and the tail end is cylindrical-shaped, and an arc groove is arranged at the connection part between the head end and the tail end. That is to say, a groove 110 on the edge of the head end includes a strip groove and an arc groove. It can be understood that the base 11 can be configured in a variety of shapes during actual production, such as a polyhedral shape. Those skilled in the art can understand that the drawings only reflect the structural principles, and the specific configuration can be revised independently according to actual use requirements.

Figure 3:
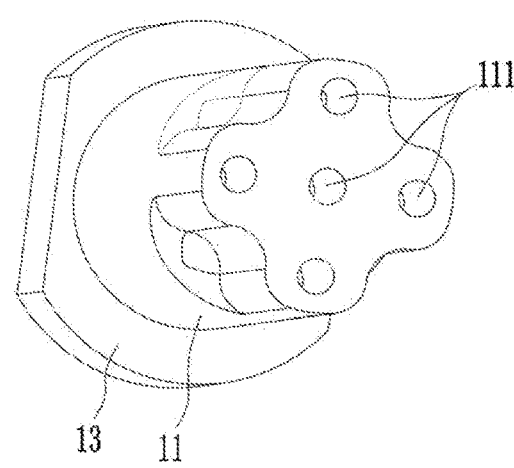
FIG. 3 is a schematic structural diagram of the mounting member and base according to an embodiment of the present disclosure.

As shown in FIG. 3, the head end of the base 11 is provided with multiple connection structures. In the present embodiment, multiple embedding holes 111 are used to detachably connect with multiple pins 12 one by one. However, the solution is not limited to this, and the connection structure can also be configured as a fastener, so that the fastener and the pin 12 are installed and disassembled. And the pin 12 is detachably connected to the base 11, so that the number of pins 12 in the valve device 10 can be adjusted according to the specifications of different blow molds (that is, having different numbers of vacuum suction holes, but the same hole size), thereby the valve device can be adapted to different blow molds, improving the use range of the valve device, and ensuring the adsorption and release effect between the decorative label and the inner wall of the blow mold.

Figure 5:
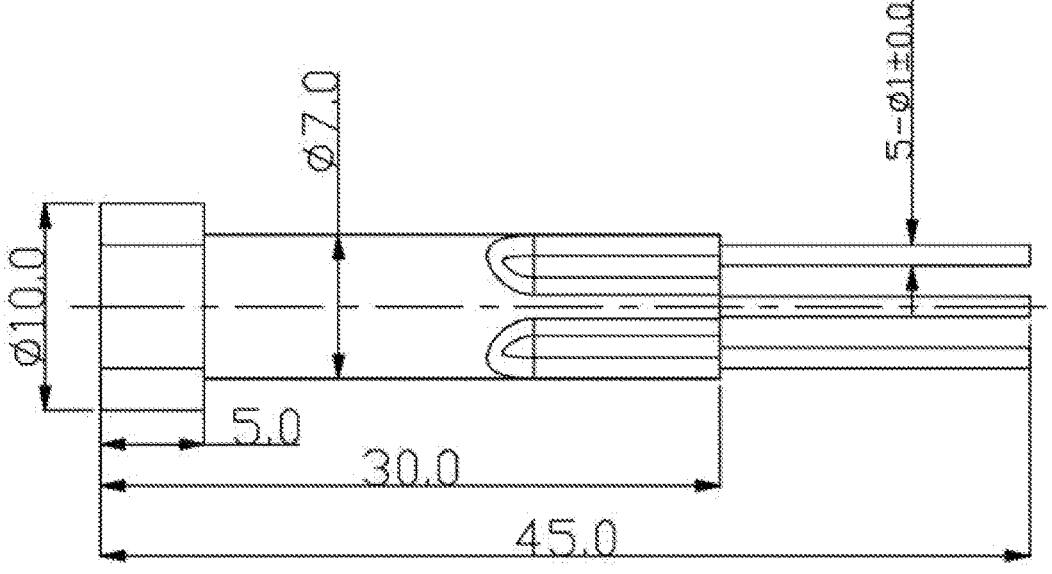
FIG. 5 is a front view of the valve device according to an embodiment of the present disclosure.
Figure 6:
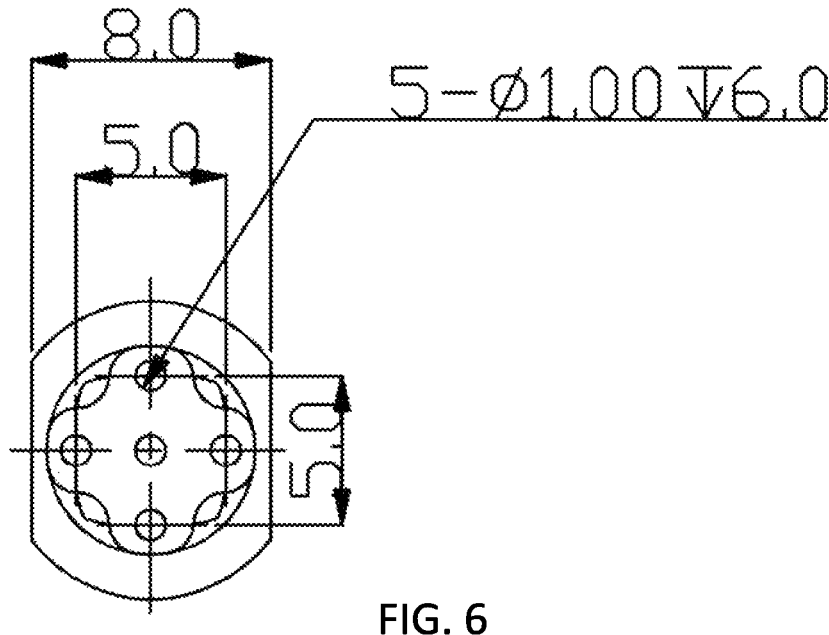
FIG. 6 is a right view of the valve device according to an embodiment of the present disclosure.

In some embodiments, as shown in FIG. 1, FIG. 5 and FIG. 6, the diameter of the pin 12 ranges from 0.2 mm to 3 mm.

The diameter of the pin 12 adopted in the present embodiment is 1 mm as shown in FIG. 5, but it is not limited to this and the diameter of the pin can also be set to 0.2 mm, 0.8 mm, 1.2 mm, 1.3 mm, 1.5 mm, 1.6 mm, 1.8 mm., 2.6 mm. The size of the vacuum suction holes in the corresponding blow mold is adapted to the size of the pin.

In some embodiments, the multiple pins 12 are evenly distributed at the head end of the base 11.

The number of pins 12 is set according to actual needs. For example, the number of pins can be set to 3, 4, 6, or 8, but is not limited to these numbers. The corresponding vacuum suction holes has the number and same arrangement of the pins, so that the pins 12 are inserted into the corresponding vacuum suction holes, respectively; the functions of the evenly distribution of the pins 12 include enabling the valve device 10 to be stably connected to the blow mold to extract air from the vacuum suction holes corresponding to the pins and increasing the service life of the valve device.

In another embodiment, the pin 12 adopts the arrangement of each pin having a diameter of 1.5 mm, and four pins being arranged in a rectangular array. Each of the front and rear molds of the blow mold are provided with one, but it is not limited to this.

In the present embodiment, as shown in FIG. 1 and FIG. 6, the number of the pins is five, wherein four pins are distributed at each end point of a "cross" shape and one pin at a midpoint of the cross shape.

In the present embodiment, the four pins located on the outside (at the four ends of the cross) are distributed in an array, and the one pin located in the middle (cross point) is at the same distance from the other four pins. Further, as shown in FIG. 6, the distance between two pins that are symmetrical about the middle pin 12 is 5 mm.

In some embodiments, the valve device also includes a driver (not shown in the drawing) connected to the base 11, wherein the driver is used to control the movement of the base 11 (that is, to realize the extension and retraction of the base and the multiple pins). It should be noted that the driver can control all the pins 12 to move out from the vacuum suction hole, or control the pin 12 to partially move out of the vacuum suction hole (in this state, air can be extracted from the gap between the vacuum suction hole and the pin).

The driver in this embodiment is a cylinder, so that an end of the cylinder is connected to a tail end of the base, so that the movement of the base 11 drives the pin 12 to move left and right (the left and right directions in FIG. 5), so that the head end of the base 11 (i.e., the front end surface in FIG. 3) abuts against the outer wall of the blow mold, and the pin 12 is inserted into the vacuum suction hole, thereby preventing air from being discharged from the vacuum suction hole.

It is worth mentioning that before the decorative object (i.e., the decorative label 22) reaches the mold, the pin 12 of the valve device 10 is retracted, and the decorative object is adsorbed on the inner wall of the mold through the vacuum provided by the adsorption hole (i.e., the vacuum suction hole). Then, the mold is closed, and the pin 12 in the valve moves forward to block the vacuum suction hole before blowing in high-pressure air, and the decorative label 22 is released. High-pressure air is blown into the preform, and the decorative label is released and adhered to the bottle body 23.

Figure 4:
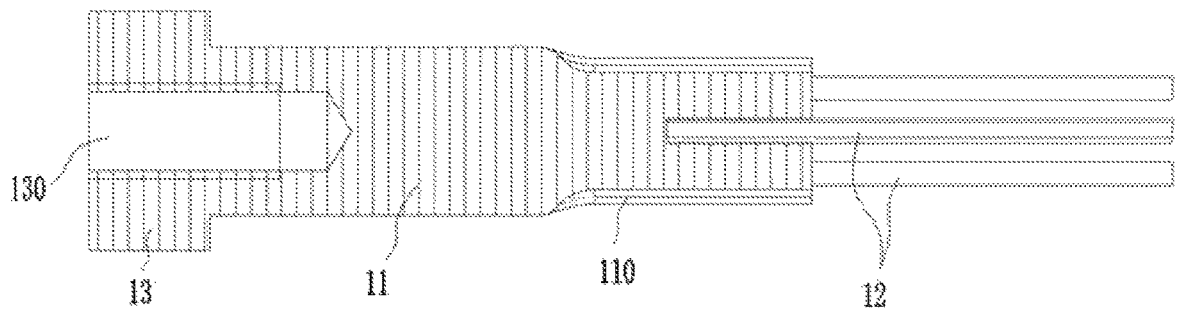
FIG. 4 is a cross-sectional view of the valve device according to an embodiment of the present disclosure.
Figure 7:
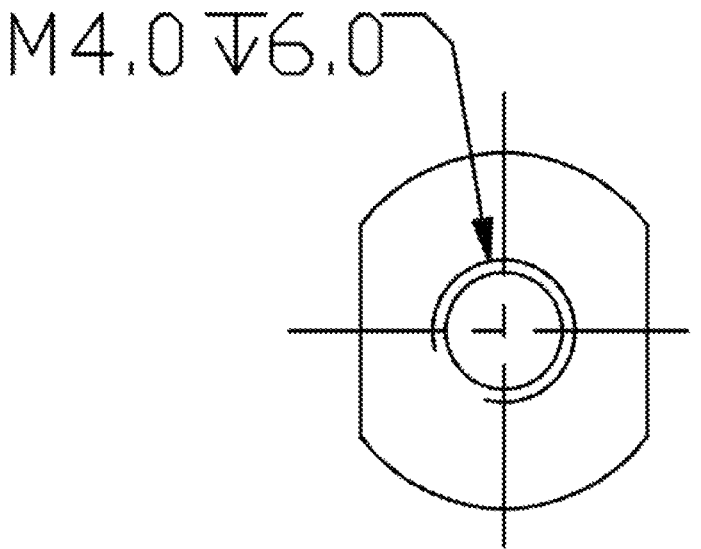
FIG. 7 is a left view of the valve device according to an embodiment of the present disclosure.

In some embodiments, as shown in FIG. 1, FIG. 4 and FIG. 7, the valve device also includes a mounting member 13 located on the side of the base 11 away from the pin 12. The mounting member 13 is provided with a mounting hole 130 (i.e., a threaded hole), and one end of the driver is arranged in the mounting hole.

The mounting hole 130 on the mounting member 13 is connected to the bolt at the end of the cylinder. The mounting hole 130 adopts M4 screw threads with a hole depth of 6 mm. The mounting member 13 has end surface on both sides and a curved surface. The mounting member 13 and the base 11 can be integrally processed or separately installed, which are not limited here.

In the present embodiment, as shown in FIG. 3 and FIG. 4, the head end of the base 11 is provided with a plurality of evenly distributed embedding holes 111, and the pins 12 are arranged corresponding to the plurality of embedding holes 111 one by one.

A tail end of the pin 12 is inserted into the embedding hole 111, and the size of the embedding hole 111 corresponds to the size of the pin 12. As further shown in FIG. 6, the embedding hole 111 has a diameter of 1 mm and a hole depth of 6 mm. The length of the pin 12 extending out of the base 11 is 15 mm. The extended end of the pin 12 is completely inserted into the vacuum suction hole of the blow mold. When the head end of the base 11 abuts against the mold, the pin 12 can also pass through the vacuum suction hole to push the decorative label, further achieving the release of the blow mold to the decorative label.

In an embodiment, as shown in FIG. 1 and FIG. 4, the edge of the base 11 is provided with a plurality of grooves 110 distributed in an array. The grooves 110 are used to guide the air flow on both sides of the vacuum hole.

When the air in the blow mold is extracted, the air passes through the vacuum suction hole and is discharged outward through the grooves 110, the guidance of the air flow is achieved and the adsorption effect and adsorption efficiency between the mold and the label are improved.

It can be understood that the vacuum suction hole of the blow mold has two functions. One is to ensure that the label and the mold cavity wall (i.e., the inner wall of the mold) are closely attached, and the other one is to block the leakage. At the same time, the hole size has a great impact on the appearance of the product, so the depth is designed moderate.

In the present disclosure, the following aspects are fully considered: First. The size and distribution of the holes, which ensure the holes remaining unobstructed during use. While using purified compressed air, preventing melted plastic raw materials from clogging the holes is also crucial. Second, providing a negative pressure mechanism to ensure that the part (label) is adhered to the cavity wall in the cavity before blow molding, and maintain the set position relationship to complete the blow molding of qualified products. Third, once the label falls off, the pressure in the cavity changes sharply. In order to avoid such problems, a negative pressure mechanism and the PLC control system are provided to close the plug and prevent the label from being blown into the vacuum channel and causing blockage.

Based on the embodiments, the present disclosure also provides a blow molding system, which includes the valve device and the blow mold as described in any one of above, as shown in FIG. 1 and FIG. 2.

The blow mold 21 is provided with a plurality of vacuum suction holes, and the plurality of vacuum suction holes correspond to the pins 12 one by one.

In an embodiment, the system further includes a pump body (not shown in the drawing) located outside the blow mold. The pump body is used to extract the air in the blow mold 21 through the vacuum suction holes, so that the decorative label 22 is adsorbed on the inner wall of the blow mold 21.

The present disclosure can automatically turn off the vacuum pressure in the mold to prevent hot blow molding materials from clogging the vacuum channel and damaging the mold. The adsorption and release of the decorative label 22 of the present disclosure is driven by changes in vacuum pressure in the system, thereby completing the adsorption and release of parts.

The present disclosure can automatically turn off the vacuum at the end to avoid placing one label in a cavity that requires two labels (i.e., decorative labels) to make a qualified part. The present disclosure includes a vacuum sensing controller that provides the choice of one label or two labels.

In the description of the present disclosure, unless otherwise limited, the terms "installation", "connection", "connect", "fixing" and other terms should be understood in a broad sense. For example, it can be a fixed connection or a detachable connection, or integration. It can be mechanical connection, electrical connection, or mutual communication connection. It can be directly connected, or indirectly connected through an intermediate medium. It can be the internal connection of two elements or the interaction of two elements. For those skilled in the art, the meanings of the above terms in the present disclosure can be understood according to the circumstances.

In the description of the present disclosure, it needs to be understood that the directions or positional relationships indicated by the terms "center", "longitudinal", "transverse", "length", "width", "thickness", "upper", "lower", "front", "back", "left", "right", "vertical", "horizontal", "top", "bottom", "inside", "outside", etc. are based on the directions or positions shown in the accompanying drawings. The positional relationship is only for the convenience of describing the present disclosure and simplifying the description, and does not indicate or imply that the device or element referred to must have a specific orientation, be constructed and operated in a specific orientation, and therefore cannot be understood as a limitation of the present disclosure.

In addition, the terms "first" and "second" are used for descriptive purposes only and cannot be understood as indicating or implying relative importance or implicitly indicating the quantity of technical features. Therefore, features defined as "first" and "second" may explicitly or implicitly include one or more of these features. In the description of the present disclosure, "plurality" means at least two, such as two, three, etc., unless otherwise expressly and specifically limited.

Finally, it should be noted that the above embodiments are only used to illustrate the technical solution of the present disclosure, but not to limit it. Although the present disclosure has been described in detail with reference to the foregoing embodiments, those skilled in the art should understand that the technical solutions described in the foregoing embodiments can still be modified, or some or all of the technical features can be equivalently substituted; and these modifications or substitutions do not deviate the essence of the corresponding technical solutions from the technical solutions of the embodiments of the present disclosure.

What is claimed is:

1. A valve device operable to be used in a blow mold having an inner wall, an outer wall, and multiple vacuum suction holes, wherein a decorative label for affixing to a bottle body is placed in the blow mold, the valve device comprising:

a base having a head end; and multiple pins that are evenly radially distributed around the head end of the base, wherein the multiple pins are configured to be inserted into the multiple vacuum suction holes of the blow mold, and wherein the base is operable to abut against or move away from the outer wall of the blow mold to facilitate the inner wall of the blow mold to release or adsorb the decorative label.

2. The valve device according to claim 1, wherein diameters of the multiple pins are in a range of 0.2 mm to 3 mm.

3. The valve device according to claim 1, wherein the multiple pins comprise four pins distributed at each end point of a cross shape and one pin at a midpoint of the cross shape.

4. The valve device according to claim 1 further comprising a driver connected to the base, wherein the driver is used to control a movement of the base.

5. The valve device according to claim 4 further comprising:

a mounting member located on a side of the base spaced away from the multiple pins; and a mounting hole disposed on the mounting member, wherein one end of the driver is disposed in the mounting hole.

6. The valve device according to claim 1, wherein a plurality of embedding holes are evenly radially distributed around the head end of the base, and the multiple pins are disposed in one-to-one correspondence with the plurality of embedding holes.

7. The valve device according to claim 1, wherein a plurality of grooves distributed in an array are disposed on an edge of the base, wherein the plurality of grooves are configured to guide a flow of air on an inner side and an outer side of the multiple vacuum suction holes.

8. A blow molding system comprising the valve device and the blow mold according to claim 1.

9. The blow molding system according to claim 8 further comprising a pump body located outside the blow mold, wherein the pump body is adopted to extract air from the blow mold through the multiple vacuum suction holes to facilitate the inner wall of the blow mold to adsorb the decorative label.

\* \* \* \* \*